United States Patent [19]
Bergeron

[11] 3,944,093
[45] Mar. 16, 1976

[54] SOILED-DISHES HANDLING APPARATUS
[75] Inventor: Maurice Bergeron, La Celle Saint-Cloud, France
[73] Assignee: Compagnie Europeenne de Manutention, Paris, France
[22] Filed: Mar. 17, 1972
[21] Appl. No.: 235,677

[30] Foreign Application Priority Data
  Mar. 23, 1971  France .................. 71.10111

[52] U.S. Cl. .................. 214/310; 198/267
[51] Int. Cl.² .................. B65G 47/06
[58] Field of Search.. 214/309, 310; 198/27, 33 AC, 198/267, 280; 193/DIG. 1

[56] References Cited
UNITED STATES PATENTS
3,153,471  10/1964  Arnett .................. 198/33 AC
3,530,971  9/1970   Babunovic .................. 198/33 AC
3,722,719  3/1973   Frank .................. 214/310

FOREIGN PATENTS OR APPLICATIONS
56,217  5/1967  Germany .................. 214/310

Primary Examiner—Robert J. Spar
Assistant Examiner—Lawrence J. Oresky
Attorney, Agent, or Firm—Ernest G. Montague; Karl F. Ross; Herbert Dubno

[57]  ABSTRACT

The handling dishes and like articles before washing them comprises the transport of the articles on special trays formed with bottom apertures permitting the passage therethrough of members for driving, lifting and tilting the articles by moving the members in a vertical plane. Thus, the articles are picked up from the trays and dropped onto a transfer path or another conveyor directing them to the washing means. The apparatus has retractable stop means for retaining the trays during the removal of the articles carried thereby, lever arms adapted to engage the tray apertures, and guide means for directing the thus removed dish articles to the transfer path or other conveyor.

7 Claims, 6 Drawing Figures

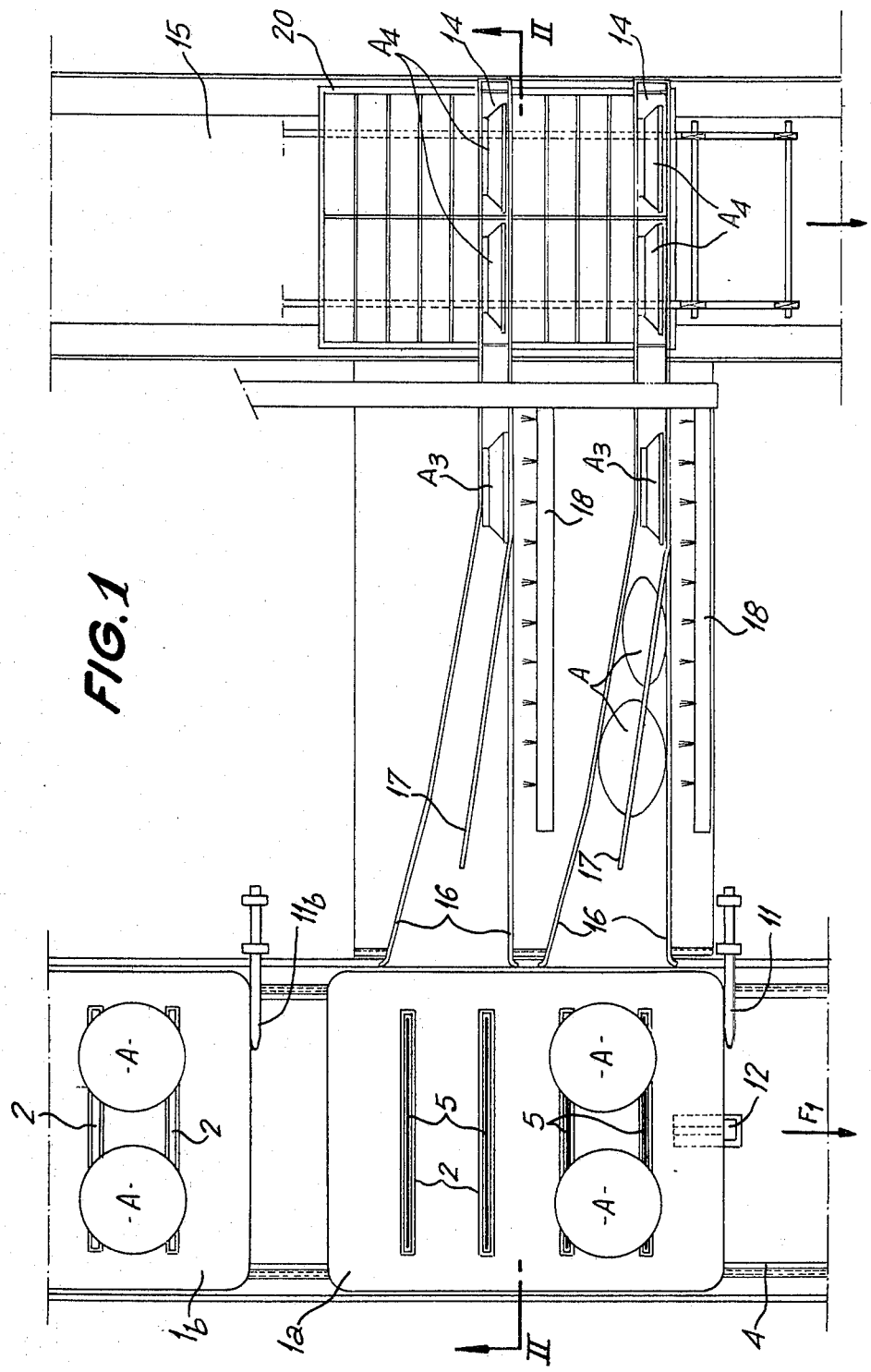

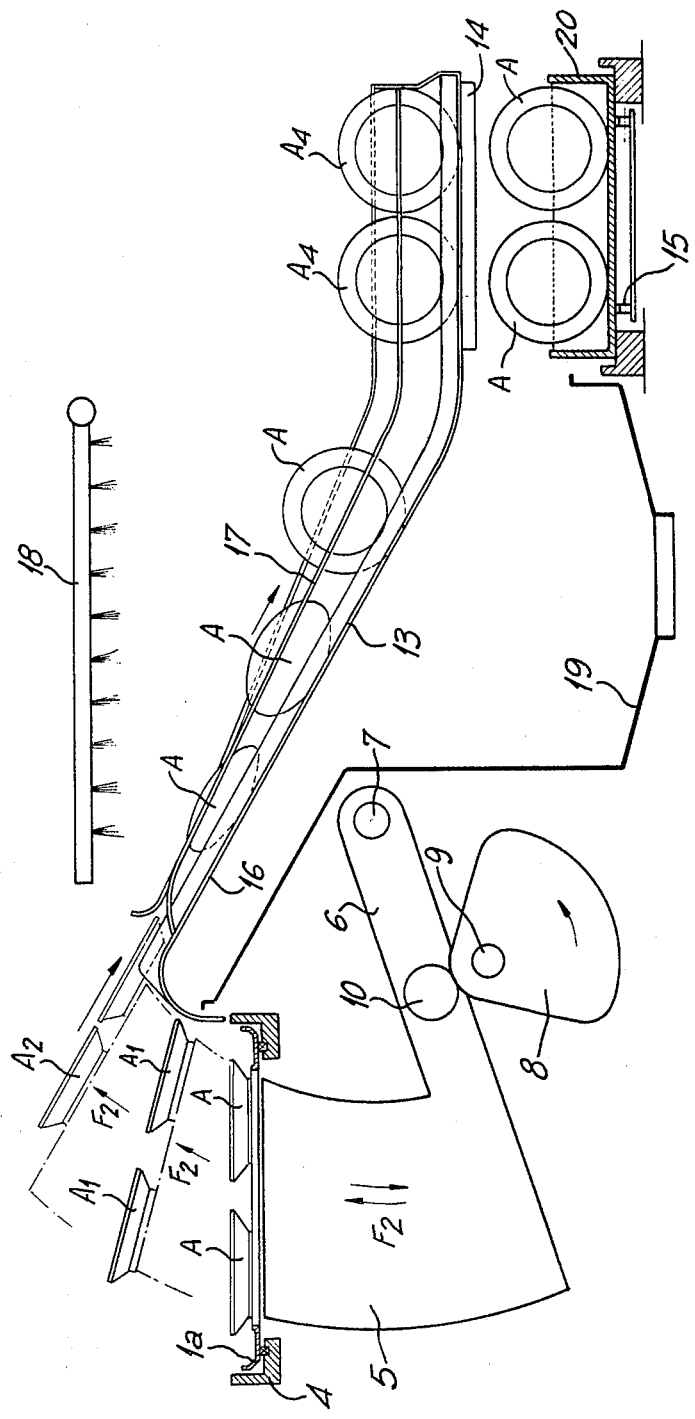

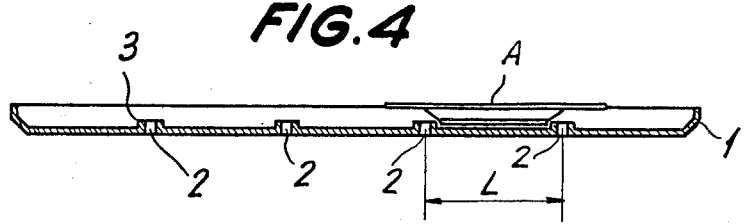
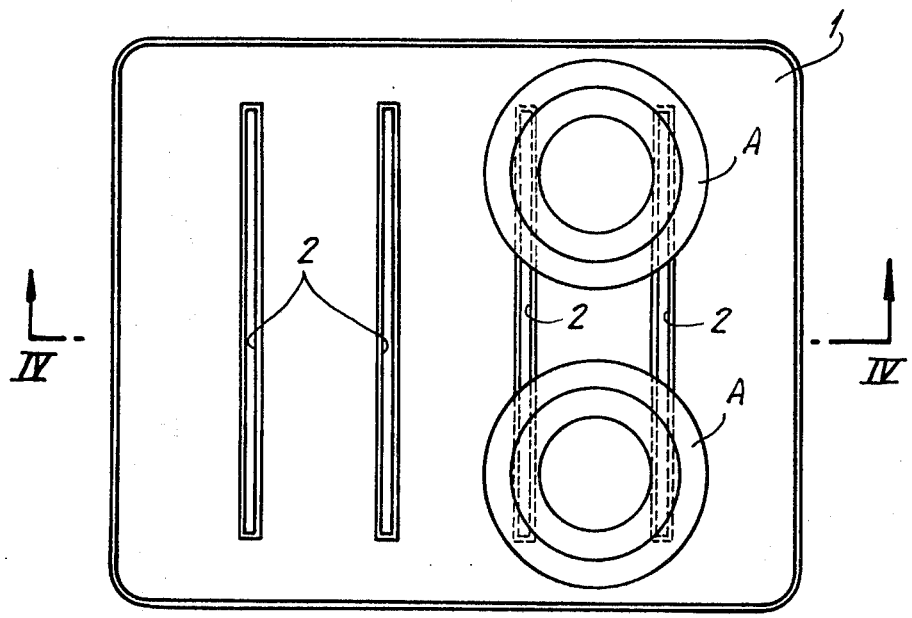
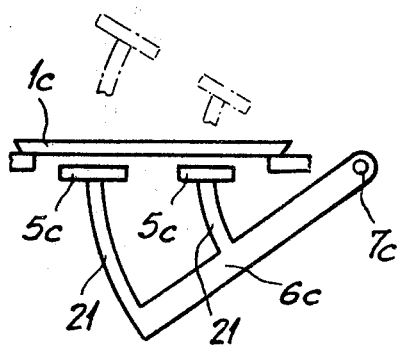
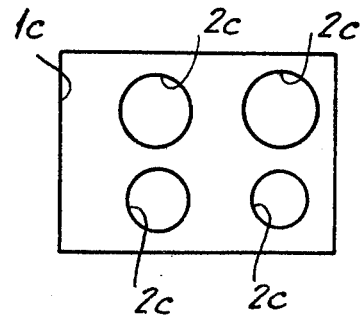

SOILED-DISHES HANDLING APPARATUS

The present invention relates to the handling of soiled dishes preliminary to the washing thereof, especially for restaurant use, and more particularly in self-service restaurants or cafeterias, large commercial or personnel kitchens and the like.

It is known that in restaurants or cafeterias of this character the food is presented to and available to the public in the form of portions or helpings contained in dishes disposed on distribution counters. The users can thus help themselves by selecting the desired dishes or courses from the counter and placing them on a self-service tray.

After the meal, each tray carrying the various items such as soiled or dirty glasses, bottles, dishes fork and spoon, is directed to a washroom.

The trays carrying the soiled dishes are recovered by personnel specially entrusted with this operation. However, transport carts as well as conveyor systems may be used to this end. Besides, in certain restaurants serving a great number of customers or users, the dirty or soiled dishes may be transferred completely by means of one or more conveyors without resorting to personnel specially trained for this work. In this case the users are requested to lay their trays on the corresponding conveyors.

As a rule, a plurality of sorting stations are provided along these conveyors so that the various items can be properly selected as a function of their specific nature in order to be subsequently washed or treated as required. Thus, a first sorting station may be provided whereat an employee must remove the glasses and direct the latter to the glass washing machine.

A second sorting station may be provided for picking up the dish from the tray travelling past. In this case, the employee must remove the food wastes, scraps and residue to prevent clogging of the dishwasher therewith, and thus permit a normal operation of this machine.

Finally, a third sorting station may be provided for removing other dishes from the tray, for example a cheese dish and a dessert dish. The employee servicing this station may also be entrusted, for example, with the removal of the fork knife and spoon used during the meal.

From the foregoing it appears clearly that the sorting of dishes requires the intervention of at least three persons and sometimes more. Under these conditions, this operation is one of the most expensive, from the standpoint of labor, among all those required for the proper operation of a restaurant, whether in a commercial or industrial building, or in a cafeteria or other self-service, snack or like business.

Therefore, it is the object of the present invention to reduce the number of persons entrusted with the sorting operations and possibly to even dispense with any personnel for performing this operation.

To this end, the present invention provides a method of handling dirty or soiled dishes, which is characterized essentially in that the dishes are transferred on trays each provided with one or a plurality of apertures beneath the location contemplated for at least some of them on the tray, and that the corresponding dishes or like items are picked up by engaging movable discharge members through these apertures from the lower side of each tray. Thus, the dishes or other items are lifted off and extracted from the corresponding tray, whereby they can be transferred to a guide track or conveyor adapted to direct them to a washing machine.

However, this invention is also concerned with a dish handling installation designed for carrying out this method. This installation comprises, in combination, a conveyor adapted to transfer trays supporting soiled dishes in succession, and at least one station whereat the dishes laid on the trays are adapted to be picked up, the last-named station comprising a plurality of movable pick up members arranged beneath the conveyor and adapted to be inserted through the apertures of each tray for lifting the dishes carried by each tray.

Finally, this installation comprises a guide track or pick-up conveyor, or the like, capable of receiving the pieces thus picked up for transferring them to a dishwasher.

Possibly, this installation may comprise a plurality of tray discharge stations, each station being adapted to pick up a predetermined type of dish item. However, it is a complementary object of this invention to provide dish transport trays specially designed for carrying out the handling method described hereinabove.

To this end, each tray according to the present invention comprises one or a plurality of apertures disposed beneath the positions contemplated for the dishes or like items to be picked up, said apertures being designed to permit the proper passage of the movable pick up members therethrough.

Other features and advantages of this invention will become apparent from the following description, given with reference to the accompanying drawing in which:

FIG. 1 is a fragmentary plan view from above of the dish handling installation according to this invention;

FIG. 2 is a vertical section taken along the line II—II of FIG. 1;

FIG. 3 is a plan view from above showing one of the dish distributing trays utilized in the present installation;

FIG. 4 is a section taken along the line IV-IV of FIG. 3;

FIG. 5 is a plan view from above showing on a different scale another dish transport tray adapted for use in a handling installation according to this invention; and FIG. 6 is a diagrammatic elevational view of a modified form of embodiment of this handling installation.

According to the essential feature characterizing this invention, and to the method thereof, the dishes and other items are carried on special trays 1 comprising apertures permitting the passage therethrough, from beneath, of movable discharge or pick up members adapted to remove the items carried by the tray.

In the example illustrated, these apertures comprise two pairs of slots 2. The two slots of each pair extend beneath the location contemplated for a pair of dishes A.

Preferably, the edges of these slots 2 are provided with reinforcing ribs 3 projecting from the upper surface of the tray. On the other hand, the relative spacing between the two slots of a same pair is very slightly greater than the diameter of the bottom of each dish A. Thus, the ribs 3 provided along the edges of the two slots 2 of a same pair act as convenient means for positively retaining and centering the corresponding dishes A.

In this respect, it will be seen that the slots 2 register with the peripheral edges of the dishes A when these dishes are positioned on the tray.

In the embodiment illustrated in the drawing the trays 1 are adapted to receive four dishes of a same diameter. However, the location and distribution of the slots formed through these trays may be modified to permit the use of two groups of dishes having different diameters. Besides, as will be explained presently, the apertures 2 formed in the transport trays may have many other shapes, and their relative arrangement may also differ.

The handling installation according to this invention, as shown in FIGS. 1 and 2, comprises a conveyor 4 adapted to transfer the trays 1 in the direction of the arrow $F_1$ from a loading station. At this station the users are requested to deposit their trays carrying the soiled dishes directly on this conveyor 4 in such a manner that the aforesaid slots 2 extend transversely to the direction of travel. This conveyor may be of the endless chain type, and adapted to move past a one or plurality of discharge stations where the various items or at least some of them are picked up automatically.

FIGS. 1 and 2 illustrate this discharge station adapted to pick up four dishes A each carried by a tray 1. This station comprises movable dish pick-up members consisting of vertical blades 5 adapted to be introduced through the slots 2 of tray 1 while the latter registers with this station.

In the inoperative condition, these blades are disposed beneath the conveyor 4. Each blade 5 is carried by a lever arm 6 fulcrumed about a horizontal pivot pin 7 so that the blade can be driven along a curved path shown by the arrows $F_2$ and centered of course on the pivot pin 7.

The movement of the lever arms supporting these blades 5 is controlled by a cam 8 carried by a shaft 9 rotatably driven from an electric motor (not shown), the cam 8 being adapted to co-act with a roller follower 10 carried by each lever arm 6.

The conveyor 7 comprises a retractable stop member 11 located just beyond the discharge station in order to stop very accurately each tray above this station. However, registering with this stop member is an electric switch 12 adapted to be actuated by the leading edge of each tray, for example tray 1a in the example illustrated, so as to hold the tray above the discharge station. This switch 12 controls the energization of the motor driving said cam 8 so that the latter will raise the vertical blades 5 through the slots 2 of the waiting tray 1a, from the bottom upwards.

During this movement, the vertical blades 5 lift the dishes A above the tray in order to bring them to the position $A_1$ illustrated in FIG. 2, and then to a position $A_2$ corresponding to the limit of this lifting movement.

In this respect, it may be noted that the lifting movement of said dishes is attended by a gradual inclination thereof towards the pivot pin 7. Thus, in their uppermost position the dishes tend to slide sidewise. Now at the level thus attained by the dishes there is provided for each group of dishes a guide track or path designated by the reference numeral 13 and adapted to receive the dishes of this group.

These two guide paths are inclined downwards and each of them leads to a retractable support 14 overlying another conveyor 15 adapted subsequently to transfer the dishes to a dishwasher.

During the upward movement and extraction of said dishes A from the tray 1a, the latter is held against movement by the retractable stop member 11. Under these conditions, the tray will slip on the chains or like means of the corresponding conveyor 4.

But when the vertical extraction blades 5 resume their initial positions they engage the switch 12 to stop the cam 8 and at the same time they cause the stop member 11 to be retracted from the path of the trays. Under these conditions, the tray 1a can resume its travel on the conveyor, in the direction of the arrow $F_1$.

This tray is subsequently replaced by a similar tray 1b, i.e. the next tray travelling on the conveyor, which had been retained until then by a retractable stop member 11b similar to stop member 11. In fact, the next stop member 11b is retracted simultaneously with the front stop member 11, to permit the forward movement of tray 1b to the discharge station, whereafter this stop member will resume its operative position in order to stop the next tray.

Of course, another discharge operation similar to the preceding one takes place automatically when the tray 1b registers with the corresponding station, and so forth.

Each guide track 13 adapted to receive the dishes removed from the trays comprises a pair of guide members 16 as well as a third element 17 adapted gradually to bring each dish to a substantially vertical position and to the position denoted $A_3$ in FIG. 1. Then, the dishes are taken by the aforementioned retractable support 14.

However, registering with the two guide tracks 13 are water sprinkling ramps 18 for the preliminary dish washing step. The scraps and food wastes or residues detached by gravity and also by the water jets fall into an underlying trough 19. If desired, this trough may be connected to a food waste grinder or disposer.

As already mentioned hereinabove, the two dishes of each group are then directed to their position $A_4$ overlying the pair of retractable support 14. These consist of a pair of pivoting flaps retained in a substantially horizontal position by a retractable lock bolt responsive to a gauged spring.

The arrangement is such that this lock bolt is adapted to release each support 14 with a slight time-lag when the dishes tend to move these flaps by gravity. Thus, the dishes can fall vertically from a height corresponding to their diameter into a basket or case 20 of the type currently used in commercial dishwashers.

However, at this location the dishes could also fall between the vertical pins of a dishwasher equipped with a conveyor provided with such pins.

Preferably, means are provided for properly timing the feed of racks or baskets 20 with the discharge of the various trays 1, whereby all the various compartments of this rack are filled with the dishes from a plurality of successive trays.

Thus, the present installation permits of discharging in a fully mechanical manner and without any human intervention the dishes A from their transport trays, and also of transferring the dishes into the racks of a commercial dishwasher, or directly on the conveyor of such machine. However, it should be noted that the mechanical handling operations are attended by a preliminary cleaning of the dishes, so that any clogging of the dishwasher by the food wastes possibly left in them is safely avoided. The preliminary washing step is performed without any human intervention.

Of course, the present installation may comprises a plurality of successive stations for discharging the trays 1. Thus, in addition to the above-described station intended for picking up the dishes, another station specially designed for removing the glasses may be provided.

This second station may comprise in this case one or several movable pick-up members arranged accordingly and adapted to engage one or several apertures formed in the trays 1 below the location contemplated for a glass.

Due to its very conception the present installation is capable of operating in a fully satisfactory manner, for it is particularly reliable even under the specific conditions of operation of such installations, i.e., in a moist atmosphere and exposed to projections of food wastes or other products. In fact, this installation comprises extremely sensitive mechanical members the operation of which is very reliable.

On the other hand, it may be pointed out that picking from underneath eliminates the influence of any food wastes or residues on the operation. This could not be achieved if the dish items were picked up by gripping them from above.

However, it will be readily understood that this installation should not be construed as being strictly limited to the single embodiment described hereinabove. Besides, as already mentioned in the foregoing, the apertures provided in the dish transport trays may have different shapes. Possibly, these apertures may consist of circular apertures 2c, as in the case of the tray shown in FIG. 5. The movable pick up members provided at the tray discharge stations consist in this case of circular push members 5c adapted to engage each aperture and carried by arms 21 rigid with lever arms 6c pivotally mounted at 7c (FIG. 6).

These pick up members provide the same result as in the preceding case, i.e. a combined lifting and tilting movement of the dishes cleared off the corresponding trays 1c so that, under the influence of their weight, they can slip sidewise onto guide tracks transferring them to a pick up conveyor 15.

However, the apertures of the transport trays and their lifting push members may have any other shape. Thus, each push member could be replaced by a series of pins properly disposed for engaging a same dish article.

On the other hand, instead of travelling along a curved path permitting of obtaining a combined lifting and tilting movement of the dishes, the pick up members could be arranged to perform a simple lifting movement. This would permit of clearing the dishes or other corresponding dish articles off the tray at the level of another handling member adapted to transfer them for example to a preliminary washing station or any other treatment station.

But once again, many other modifications may be contemplated in the practical embodiment of the invention.

As already explained, the present handling method as well as the corresponding installation may be used to advantage for discharging trays carrying soiled dishes in personnels or like restaurants. The same applies of course to the apertured trays specially designed for carrying out the present method.

What is claimed is:

1. In an article handling apparatus, in combination:
   a horizontally moving conveyor for transporting dishlike articles,
   a succession of trays carrying said articles, at least one aperture being provided in each of said trays under a location occupied by at least one of the articles thereon,
   at least one tray unloading station below said conveyor and at said station a movable pick up member normally lying below said conveyor adapted to pass through said aperture for lifting and ejecting an article lying horizontally thereon by a combined tilting and lifting movement to an elevated point above said station,
   means for actuating said pick up member,
   a stop member for stopping each tray above said station,
   switch means actuated by the leading edge of each tray for making said stop member stop said tray and for actuating said pick up member to pass through said aperture when said tray is stopped,
   said switch means being actuated by contact with said pick up member when same returns below said conveyor to cause said stop member to be retracted from the path of a stopped tray to allow the next tray to take its place below said station, and
   an inclined guide track at said elevated point for receiving articles ejected from said tray and including a guide member for bringing said article to a vertical position, and an underlying conveyor receiving said article in vertical position.

2. The apparatus, as set forth in claim 1, wherein:
   said apertures in said trays comprises two slots and said pick up member consists of a pair of blades adapted to move through said slots.

3. The apparatus, as set forth in claim 2, wherein:
   said slots have edges and reinforcing ribs projecting therearound from the upper surface of said trays for positively retaining and centering articles thereon.

4. The apparatus, as set forth in claim 1, further including:
   a retractable support between said guide track and said underlying conveyor;
   said support including a pair of pivoting flaps,
   a retractable lock retaining said flaps horizontally, and
   spring means actuating said lock with a slight time lag when said article contacts said flaps thereby allowing said article to fall onto said underlying conveyor.

5. The apparatus, as set forth in claim 4, wherein:
   said conveyor has a container thereon positioned below said support at a distance about equal to the diameter of said article.

6. The apparatus, as set forth in claim 1, further comprising:
   water sprinkling means mounted above said guide track for preliminarily washing said articles.

7. The apparatus, as set forth in claim 1, wherein:
   said apertures in said trays are circular and said pick up member consists of circular push members passing therethrough.

* * * * *